(12) United States Patent
Wu et al.

(10) Patent No.: US 12,232,062 B2
(45) Date of Patent: Feb. 18, 2025

(54) SYNCHRONIZATION IN SIDELINK OPERATION

(71) Applicant: QUALCOMM Incorporated, San Diego, CA (US)

(72) Inventors: Shuanshuan Wu, San Diego, CA (US); Kapil Gulati, Belle Mead, NJ (US); Gabi Sarkis, San Diego, CA (US)

( * ) Notice: Subject to any disclaimer, the term of this patent is extended or adjusted under 35 U.S.C. 154(b) by 337 days.

(21) Appl. No.: 17/804,020

(22) Filed: May 25, 2022

(65) Prior Publication Data
US 2023/0388946 A1    Nov. 30, 2023

(51) Int. Cl.
*H04W 56/00*    (2009.01)
*H04L 5/00*    (2006.01)

(52) U.S. Cl.
CPC ......... *H04W 56/001* (2013.01); *H04L 5/0048* (2013.01)

(58) Field of Classification Search
CPC ........................... H04W 56/001; H04L 5/0048
See application file for complete search history.

(56) References Cited

U.S. PATENT DOCUMENTS

| | | | |
|---|---|---|---|
| 10,575,304 B2 | 2/2020 | Faurie et al. | |
| 11,039,410 B2 | 6/2021 | Li | |
| 2018/0206272 A1* | 7/2018 | Maaref | H04L 5/0053 |
| 2020/0092685 A1* | 3/2020 | Fehrenbach | H04W 76/14 |
| 2021/0051614 A1* | 2/2021 | Gulati | H04W 56/001 |
| 2021/0329598 A1* | 10/2021 | Wang | H04W 4/40 |
| 2021/0336756 A1 | 10/2021 | Chae et al. | |
| 2021/0345360 A1* | 11/2021 | Yeo | H04W 72/20 |
| 2021/0377893 A1* | 12/2021 | Khoryaev | H04L 5/0051 |
| 2021/0385834 A1* | 12/2021 | Morozov | H04W 52/0216 |
| 2022/0191809 A1* | 6/2022 | Khoryaev | H04W 56/001 |
| 2023/0337159 A1* | 10/2023 | Fouad | H04W 56/001 |

OTHER PUBLICATIONS

International Search Report and Written Opinion—PCT/US2023/020482—ISA/EPO—Aug. 23, 2023.
Kar U.N., et al., "An Overview of Device-to-Device Communication in Cellular Networks", ICT Express, vol. 4, No. 4, Dec. 1, 2018 (Dec. 1, 2018), pp. 203-208, XP055831642, ISSN: 2405-9595, DOI: 10.1016/j.icte.2017.08.002, Oct. 2017, Retrieved from the Internet: URL: https://www.sciencedirect.com/science/article/pii/S2405959517301467/pdfft?md5=c15bc95c88dd22da76fef3066d80f3a9&pid=1-s2.0-S2405959517301467-main.pdf the whole document.
Lien S-Y., et al., "3GPP NR Sidelink Transmissions Toward 5G V2X", IEEE Access, Special Section on Communication and Fog/Edge Computing Towards Intelligent Connected Vehicles (ICVS), Received Dec. 17, 2019, Accepted Jan. 22, 2020, date of publication Feb. 13, 2020, date of current version Feb. 28, 2020, vol. 8, pp. 35368-35382.

* cited by examiner

*Primary Examiner* — Won Tae C Kim

(57) ABSTRACT

Various aspects of the present disclosure generally relate to wireless communication. In some aspects, a user equipment (UE) may determine, within a synchronization resource set, synchronization resources to use to transmit a UE-specific sidelink synchronization signal. The UE may transmit the UE-specific sidelink synchronization signal using the synchronization resources included in the synchronization resource set. Numerous other aspects are described.

30 Claims, 9 Drawing Sheets

SYNCHRONIZATION IN SIDELINK OPERATION

FIELD OF THE DISCLOSURE

Aspects of the present disclosure generally relate to wireless communication and to techniques and apparatuses for synchronization in sidelink operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include determining, within a synchronization resource set, synchronization resources to use to transmit a UE-specific sidelink synchronization signal. The method may include transmitting the UE-specific sidelink synchronization signal using the synchronization resources included in the synchronization resource set.

Some aspects described herein relate to a UE for wireless communication. The UE may include a memory and one or more processors coupled to the memory. The one or more processors may be configured to determine, within a synchronization resource set, synchronization resources to use to transmit a UE-specific sidelink synchronization signal. The one or more processors may be configured to transmit the UE-specific sidelink synchronization signal using the synchronization resources included in the synchronization resource set.

Some aspects described herein relate to a non-transitory computer-readable medium that stores a set of instructions for wireless communication by a UE. The set of instructions, when executed by one or more processors of the UE, may cause the UE to determine, within a synchronization resource set, synchronization resources to use to transmit a UE-specific sidelink synchronization signal. The set of instructions, when executed by one or more processors of the UE, may cause the UE to transmit the UE-specific sidelink synchronization signal using the synchronization resources included in the synchronization resource set.

Some aspects described herein relate to an apparatus for wireless communication. The apparatus may include means for determining, within a synchronization resource set, synchronization resources to use to transmit an apparatus-specific sidelink synchronization signal. The apparatus may include means for transmitting the apparatus-specific sidelink synchronization signal using the synchronization resources included in the synchronization resource set.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
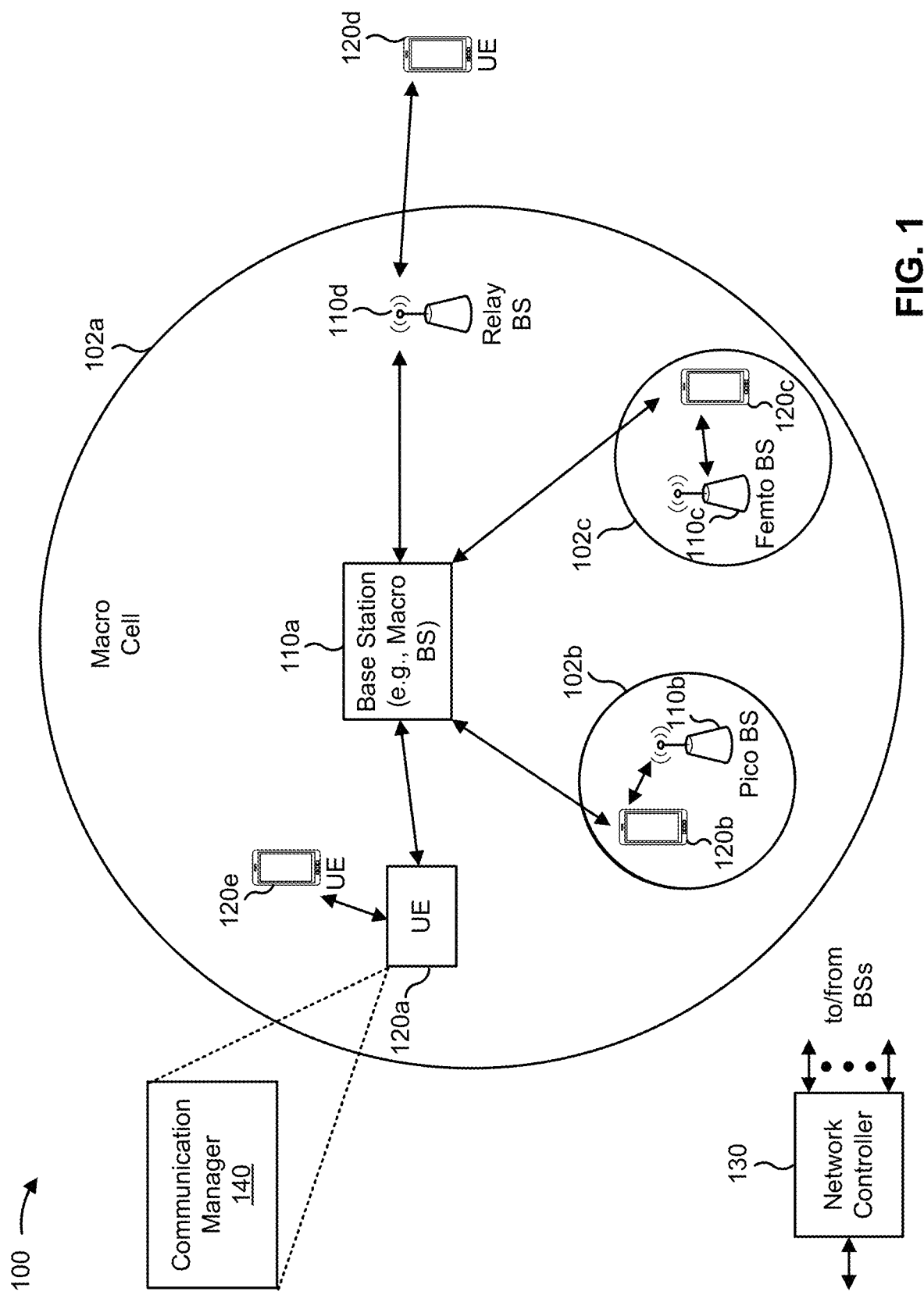
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine, within a synchronization resource set, synchronization resources to use to transmit a UE-specific sidelink synchronization signal; and transmit the UE-specific sidelink synchronization signal using the synchronization resources included in the synchronization resource set. Additionally, or alternatively, the communication manager 140 may perform one or more other operations described herein.

As indicated above, FIG. 1 is provided as an example. Other examples may differ from what is described with regard to FIG. 1.

Figure 2:
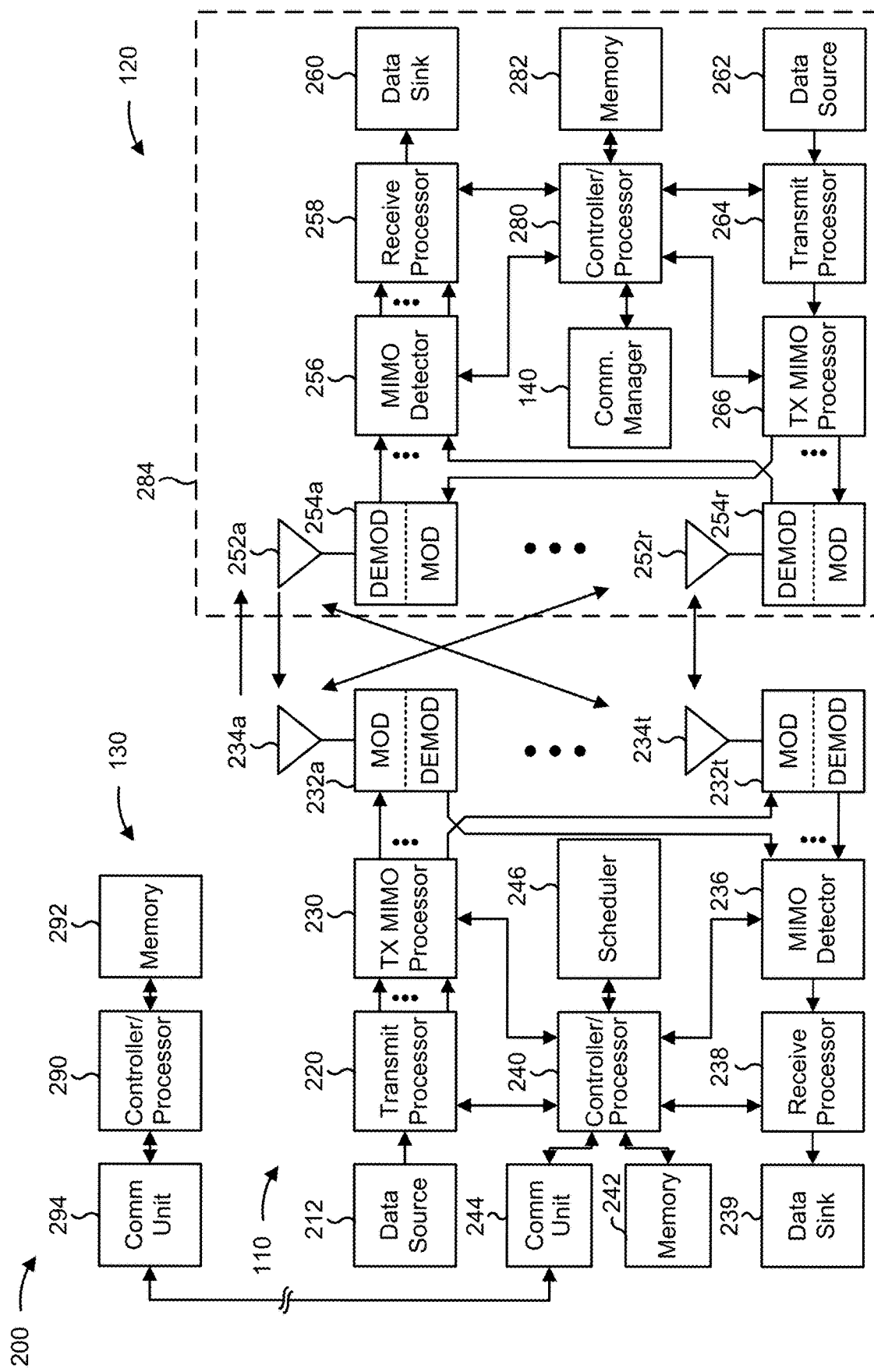
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-9).

The controller/processor 240 of the base station 110, the controller/processor 280 of the UE 120, and/or any other component(s) of FIG. 2 may perform one or more techniques associated with synchronization in sidelink operation, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8 and/or other processes as described herein. In some examples, executing instructions may include running the instructions, converting the instructions, compiling the instructions, and/or interpreting the instructions, among other examples.

In some aspects, the UE 120 includes means for determining, within a synchronization resource set, synchronization resources to use to transmit a UE-specific sidelink synchronization signal; and/or means for transmitting the UE-specific sidelink synchronization signal using the synchronization resources included in the synchronization resource set. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
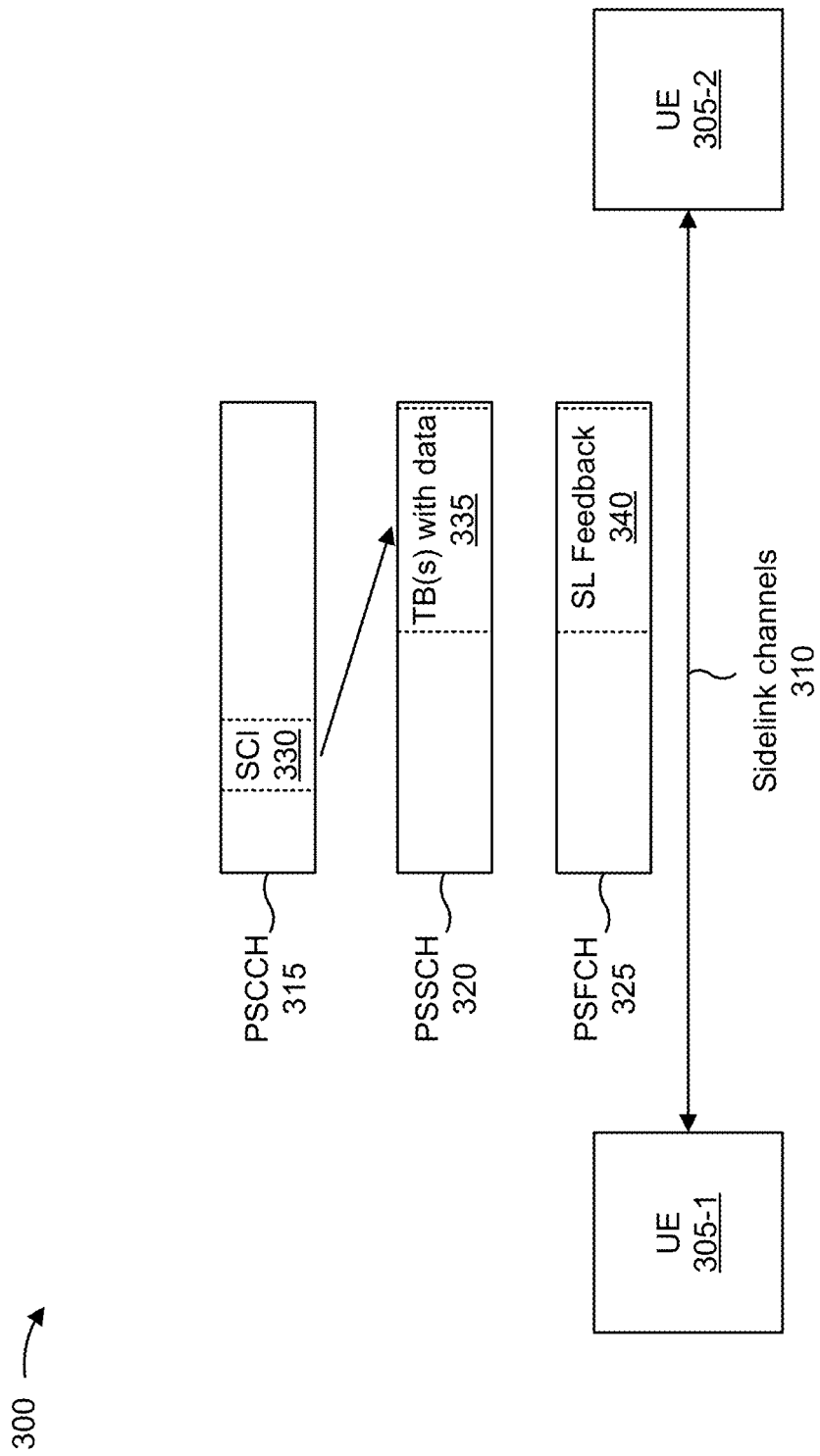
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a sidelink transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with regard to FIG. 3.

Figure 4:
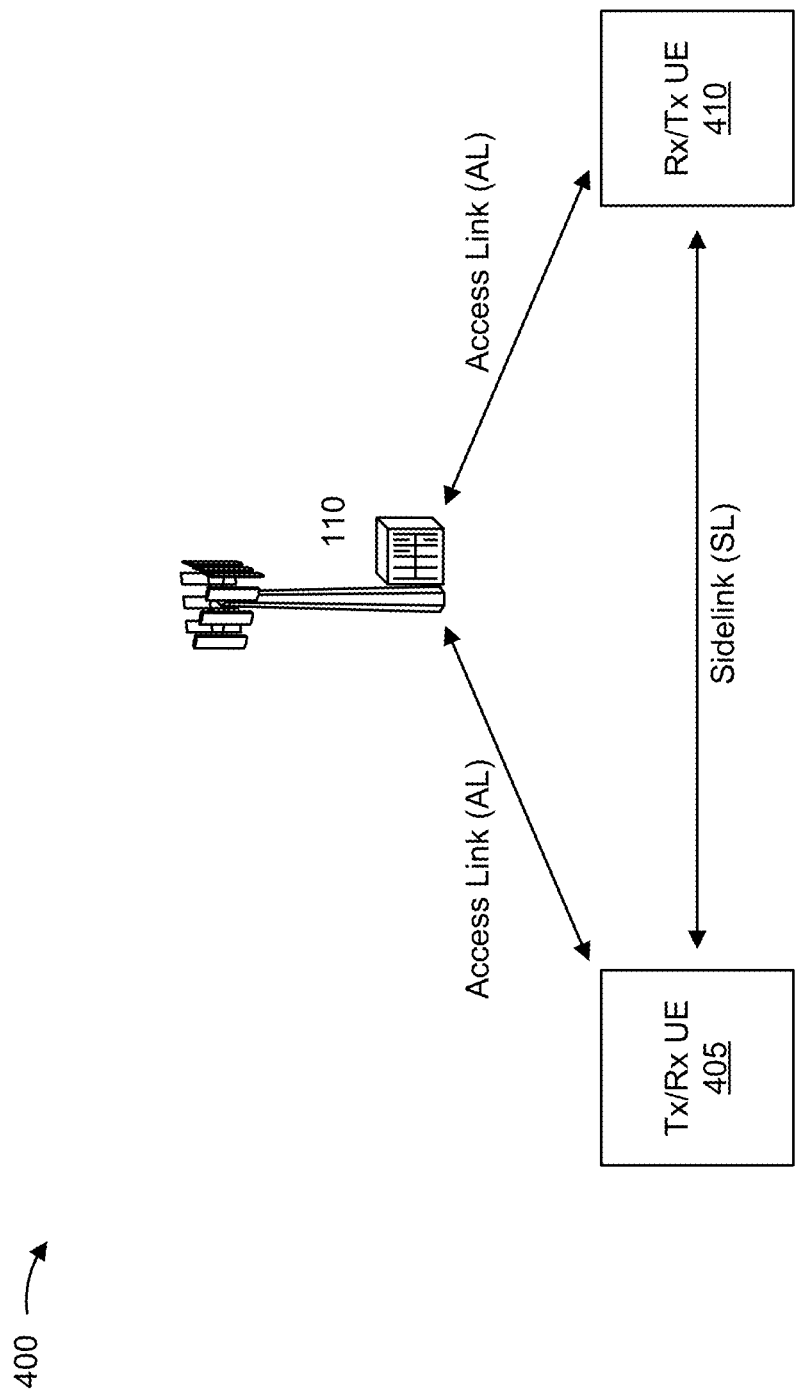
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with regard to FIG. 4.

Figure 5:
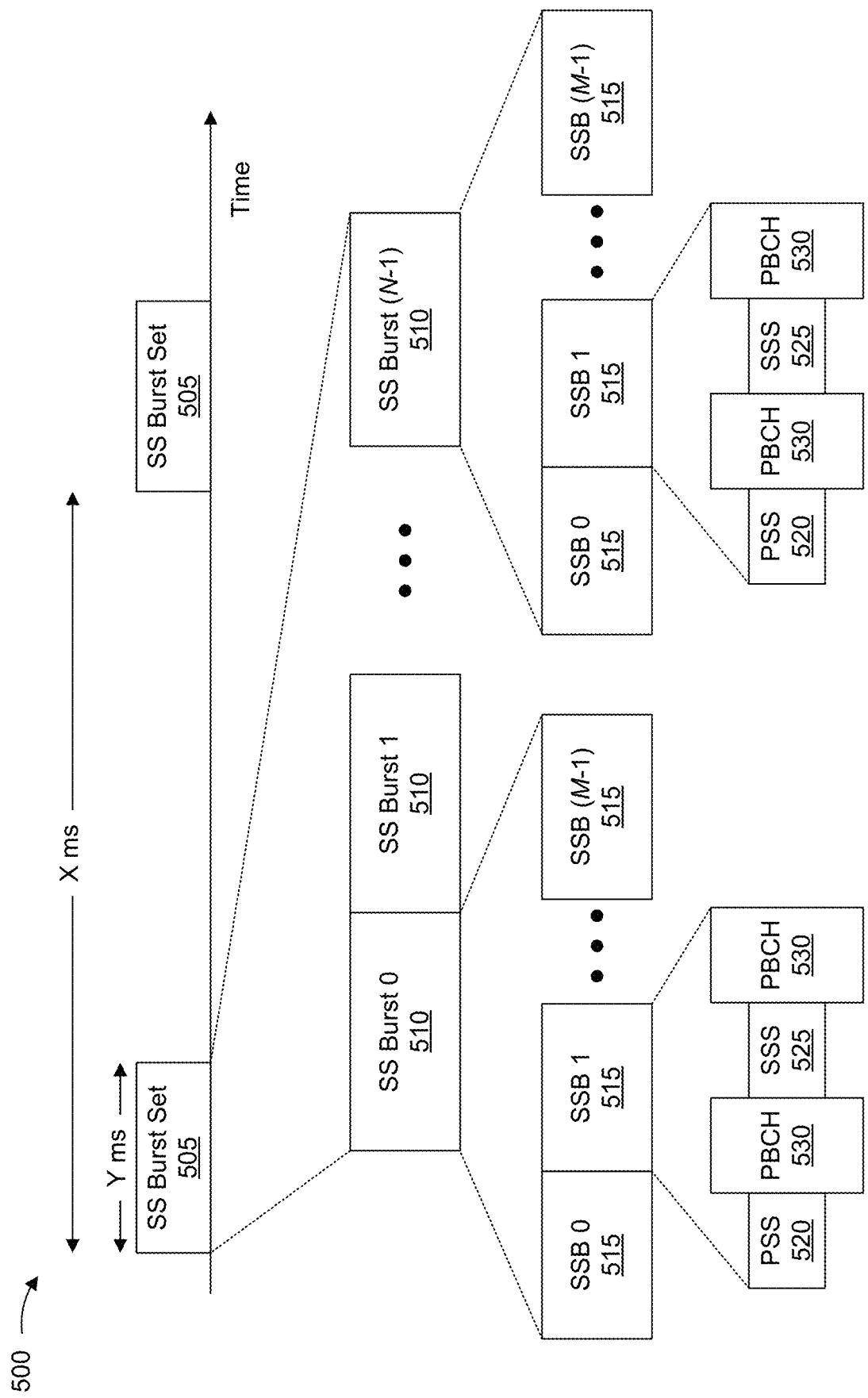
FIG. 5 is a diagram illustrating an example of a synchronization signal hierarchy, in accordance with the present disclosure.

FIG. 5 is a diagram illustrating an example 500 of a synchronization signal (SS) hierarchy, in accordance with the present disclosure. As shown in FIG. 5, the SS hierarchy may include an SS burst set 505, which may include multiple SS bursts 510, shown as SS burst 0 through SS burst N−1, where N is a maximum number of repetitions of the SS burst 510 that may be transmitted by the base station. As further shown, each SS burst 510 may include one or more SS blocks (SSBs) 515, shown as SSB 0 through SSB M−1, where M is a maximum number of SSBs 515 that can be carried by an SS burst 510. In some aspects, different SSBs 515 may be beam-formed differently (e.g., transmitted using different beams), and may be used for cell search, cell acquisition, beam management, and/or beam selection (e.g., as part of an initial network access procedure). An SS burst set 505 may be periodically transmitted by a wireless node (e.g., base station 110), such as every X milliseconds, as shown in FIG. 5. In some aspects, an SS burst set 505 may have a fixed or dynamic length, shown as Y milliseconds in FIG. 5. In some cases, an SS burst set 505 or an SS burst 510 may be referred to as a discovery reference signal (DRS) transmission window or an SSB measurement time configuration (SMTC) window.

In some aspects, an SSB 515 may include resources that carry a primary synchronization signal (PSS) 520, a secondary synchronization signal (SSS) 525, and/or a physical broadcast channel (PBCH) 530. In some aspects, multiple SSBs 515 are included in an SS burst 510 (e.g., with transmission on different beams), and the PSS 520, the SSS 525, and/or the PBCH 530 may be the same across each SSB 515 of the SS burst 510. In some aspects, a single SSB 515 may be included in an SS burst 510. In some aspects, the SSB 515 may be at least four symbols (e.g., OFDM symbols) in length, where each symbol carries one or more of the PSS 520 (e.g., occupying one symbol), the SSS 525 (e.g., occupying one symbol), and/or the PBCH 530 (e.g., occupying two symbols). In some aspects, an SSB 515 may be referred to as an SS/PBCH block.

In some aspects, the symbols of an SSB 515 are consecutive, as shown in FIG. 5. In some aspects, the symbols of an SSB 515 are non-consecutive. Similarly, in some aspects, one or more SSBs 515 of the SS burst 510 may be transmitted in consecutive radio resources (e.g., consecutive symbols) during one or more slots. Additionally, or alternatively, one or more SSBs 515 of the SS burst 510 may be transmitted in non-consecutive radio resources.

In some aspects, the SS bursts 510 may have a burst period, and the SSBs 515 of the SS burst 510 may be transmitted by a wireless node (e.g., base station 110) according to the burst period. In this case, the SSBs 515 may be repeated during each SS burst 510. In some aspects, the SS burst set 505 may have a burst set periodicity, whereby the SS bursts 510 of the SS burst set 505 are transmitted by the wireless node according to the fixed burst set periodicity. In other words, the SS bursts 510 may be repeated during each SS burst set 505.

In some aspects, an SSB 515 may include an SSB index, which may correspond to a beam used to carry the SSB 515. A UE 120 may monitor for and/or measure SSBs 515 using different receive (Rx) beams during an initial network access procedure and/or a cell search procedure, among other examples. Based at least in part on the monitoring and/or measuring, the UE 120 may indicate one or more SSBs 515 with a best signal parameter (e.g., an RSRP parameter) to a base station 110. The base station 110 and the UE 120 may use the one or more indicated SSBs 515 to select one or more beams to be used for communication between the base station 110 and the UE 120 (e.g., for a random access channel (RACH) procedure). Additionally, or alternatively, the UE 120 may use the SSB 515 and/or the SSB index to determine a cell timing for a cell via which the SSB 515 is received (e.g., a serving cell).

As indicated above, FIG. 5 is provided as an example. Other examples may differ from what is described with regard to FIG. 5.

Figure 6:
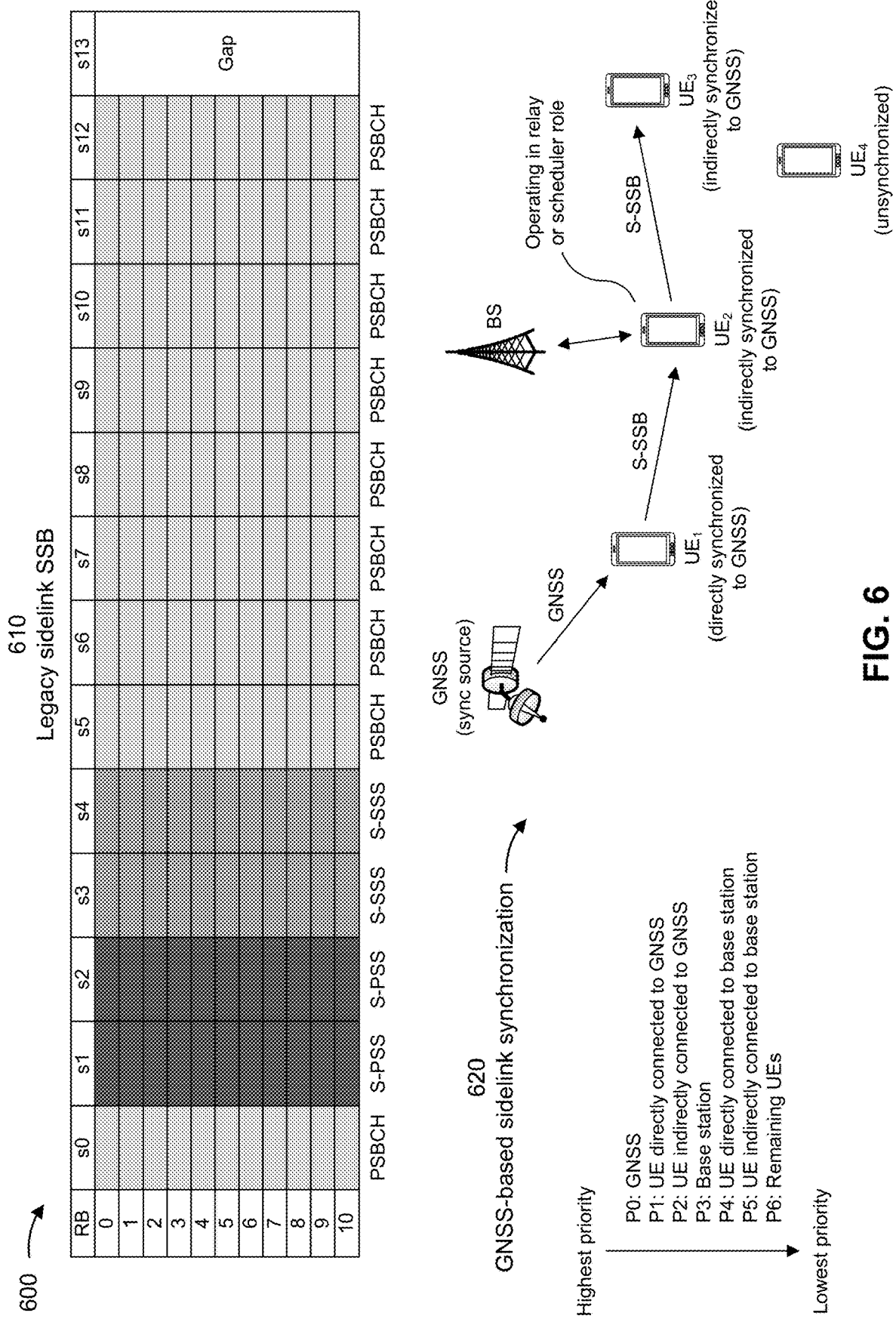
FIG. 6 is a diagram illustrating an example of decoupled synchronization and communication in sidelink operation, in accordance with the present disclosure.

FIG. 6 is a diagram illustrating an example 600 of decoupled synchronization and communication in sidelink operation, in accordance with the present disclosure.

In a typical cellular network, a UE may achieve time and frequency synchronization on an access link using periodic broadcasts (e.g., periodic SSB transmissions) from a base station. In a similar respect, in sidelink operation, one or more synchronization sources may transmit sidelink synchronization information to establish a reference time, indicate symbol timing, indicate frame timing, and/or otherwise transmit information to ensure that nearby UEs engaged in sidelink communication have the same timing reference. For example, the sidelink synchronization information may be carried in a sidelink SSB (S-SSB) that occupies one slot and uses the same numerology as configured in a sidelink bandwidth part (e.g., the same numerology as a PSCCH and/or PSSCH). For example, as shown by reference number 610, an S-SSB generally includes eleven (11) RBs over thirteen (13) symbols in a slot, where a physical sidelink broadcast channel (PSBCH) is transmitted in the first symbol (s0) and the sixth through thirteenth symbols (s5 through s12), a sidelink PSS (S-PSS) is transmitted in the second and third symbols (s1 and s2), and a sidelink SSS (S-SSS) is transmitted in the fourth and fifth symbols (s3 and s4). In this case, the S-PSS and S-SSS may occupy 127 subcarriers and use the same sequences as a PSS and SSS used for an access link SSB, and the PSBCH/DMRS may occupy 132 subcarriers. In a sidelink SSB configuration, the last (fourteenth) symbol is reserved as a gap symbol or a guard symbol for transmission/reception retuning due to the sidelink being configured as a time division duplexing (TDD) band.

The S-PSS and S-SSS may be jointly referred to as a sidelink synchronization signal (SLSS), which is used for time and frequency synchronization among nearby UEs. For example, as described herein, nearby UEs may include UEs that are in sidelink communication with each other, UEs that are within a threshold proximity of each other, and/or UEs that are within a communication range of each other, among other examples. By detecting the SLSS sent by a synchronization source, a UE may synchronize to the synchronization source and estimate the beginning of the frame and carrier frequency offsets. The UE can use a sidelink timing reference provided by the synchronization source for sidelink transmissions with nearby UEs that are using the same timing reference. Accordingly, a transmitting UE does not need to also transmit S-SSBs. The S-PSS and the S-SSS each include sequences of 127 bits. The S-PSS is generated from maximum length sequences (m-sequences) using the same polynomial and initial values as used for generating the m-sequences in an access link PSS. The S-SSS is generated from Gold sequences that use the same design (e.g., generator polynomials, initial values, and cyclic shifts) utilized for generating the Gold sequences for an access link SSS. Furthermore, the PSBCH is transmitted along with the SLSS (e.g., the S-PSS and S-SSS) in an S-SSB in order to convey information related to synchronization, such as a direct frame number (DFN), an indication of slot-level and symbol-level time resources for sidelink transmissions, an in-coverage indicator, and/or other suitable information. The S-SSB is transmitted by a synchronization source periodically every 160 milliseconds (ms), where there are N repetitions within the 160 ms period, where N is preconfigured and/or configured by a base station depending on a subcarrier spacing.

In existing wireless networks, one challenge that may arise in sidelink operation is that sidelink synchronization procedures and sidelink communication procedures are decoupled, which differs from access link communication. For example, in access link communication, a UE communicating with a base station on an uplink and a downlink is also synchronized to the base station. On the other hand, in sidelink operation, a node that is acting as a synchronization source and transmitting an SLSS or S-SSB (e.g., a GNSS transmitter, a base station, or a UE) is not necessarily a sidelink transmitter or a sidelink receiver for UEs that are synchronized to the synchronization source, and in some cases the synchronization source may not even be involved in sidelink communication. More particularly, in sidelink operation, synchronization is based on predefined hierarchical synchronization procedures that are defined such that a UE is always synchronized to a synchronization source that has a higher priority. For example, reference number 620 depicts an example of GNSS-based synchronization that may be used in sidelink operation, which defines a synchronization hierarchy in which a GNSS signal has a highest priority (such as priority P0), whereby a UE synchronizes to GNSS timing whenever the GNSS signal is available. In cases where the GNSS signal is unavailable, the UE searches for and synchronizes to S-SSBs based on a descending priority, where a UE directly synchronized to the GNSS signal has a second highest priority (such as priority P1), a UE indirectly synchronized to the GNSS signal has a next highest priority (such as priority P2), a base station has a next highest priority (such as priority P3), a UE directly synchronized to a base station has a next highest priority (such as priority P4), a UE indirectly synchronized to a base station signal has a next highest priority (such as priority P5), and remaining UEs have a lowest priority (such as priority P6). In the example shown in FIG. 6, $UE_1$ is directly synchronized to the GNSS signal and therefore has a second highest priority P1, and $UE_2$ and $UE_3$ have lower priorities (such as priority P2) due to being indirectly synchronized to the GNSS signal (e.g., via an S-SSB transmitted by $UE_1$). Alternatively, in some cases, base station-based synchronization may be used, in which case the respective priorities of the base station and the GNSS signal are reversed (e.g., priorities P3-P5 and priorities P0-P2 in the GNSS-based hierarchy respectively correspond to priorities P0-P2 and priorities P3-P5 in the base station-based hierarchy).

In cases where there are multiple nodes acting as synchronization sources, the different synchronization sources may transmit a sidelink synchronization signal (e.g., an S-SSB, or an S-PSS and an S-SSS, jointly referred to as an SLSS) in a single-frequency network (SFN) manner. In particular, when different nodes are eligible to act as synchronization sources to transmit the SLSS or S-SSB, the different nodes may all transmit the same SLSS or S-SSB using the same time and frequency resources, and any UEs that receive the SLSS or S-SSB from the transmitting nodes may determine a frame and slot boundary according to timing information indicated in or otherwise associated with the SLSS or S-SSB. The UEs that receive the SLSS or S-SSB may then engage in sidelink communication according to the timing information acquired from the SLSS or S-SSB, although not necessarily with the node that transmitted the SLSS or S-SSB. Accordingly, decoupling sidelink synchronization and sidelink communication and transmitting the SLSS or S-SSB in an SFN manner may maintain a common timing among UEs that communicate on a sidelink with other UEs in the vicinity, which may be suitable for certain sidelink communication scenarios. For example, decoupling sidelink synchronization and communication and transmitting the SLSS or S-SSB in an SFN manner may reduce synchronization overhead and interference in one-to-many sidelink communication scenarios, such as groupcast or broadcast, and/or in cases where sidelink operation is performed in a distributed manner (e.g., in Mode 2 sidelink operation, which does not rely on scheduling by a base station). However, in some sidelink scenarios, decoupled synchronization and communication may be sub-optimal.

For example, in the sidelink scenario depicted in FIG. 6, $UE_1$ may be in an open space or other position to detect the GNSS signal and is therefore directly synchronized to the GNSS signal, but $UE_2$ may be in a sheltered location or other position where the GNSS signal is unavailable. In this case, $UE_1$ may transmit an SLSS or S-SSB based on the GNSS signal detected at $UE_1$, and $UE_2$ may obtain sidelink synchronization information based on the SLSS or S-SSB transmitted by $UE_1$. However, as discussed above, $UE_1$ and $UE_2$ are not necessarily engaged in sidelink communication with each other because synchronization and communication are decoupled, whereby $UE_2$ may be synchronized to $UE_1$ while engaged in sidelink communication with another UE, such as $UE_4$ in the illustrated example. In general, decoupling sidelink synchronization and communication based on a hierarchical synchronization priority may maintain a rough synchronization status among neighboring UEs, whereby timing between a transmitter UE and a receiver UE may not be precisely aligned. For example, although timing between two UEs may be exactly aligned in cases where the two UEs are both synchronized to a GNSS signal, propagation delays during sidelink communication between the two UEs may introduce timing errors. Accordingly, the timing of sidelink communication is imperfect in cases where sidelink synchronization and communication are decoupled, which requires sidelink UEs to run a per-slot time and frequency loop (e.g., each UE has to estimate a timing error and a frequency error in every slot to optimize reception performance).

The need to run a per-slot time and frequency loop to resolve time and/or frequency errors that are caused when sidelink synchronization and communication are decoupled may be problematic or sub-optimal in certain sidelink scenarios or use cases, such as sidelink relaying or UE-scheduled sidelink communication, by adding extra complexity to a UE implementation without any apparent benefits. For example, a relay UE may operate in a sidelink relay role to relay downlink and/or uplink communications between a base station and a remote UE that may be in an out-of-coverage scenario (e.g., in FIG. 6, $UE_2$ may receive downlink transmissions from the base station via an access link and relay the downlink transmissions to a remote UE, such as $UE_4$, on a sidelink, and/or may receive uplink transmissions from the remote UE via the sidelink and relay the uplink transmissions to the base station via the access link). In such cases, the timing of the relay UE may be more important to the remote UE that is served by the relay UE, but the remote UE may need to be synchronized to a different synchronization source in cases where sidelink synchronization and communication are decoupled (e.g., the remote UE may be required to synchronize to a GNSS signal, if available, or to a different UE that is directly synchronized to the GNSS signal, if the relay UE is indirectly synchronized to the GNSS signal). In a similar respect, in a sidelink use case where a head UE is scheduling sidelink transmissions by other UEs, the timing of the head UE may be more important or relevant to the UE(s) being scheduled by the head UE. In these (and other) sidelink scenarios, decoupled synchronization and communication may at best provide coarse time and/or frequency synchronization for sidelink operation, but a receiver UE engaged in sidelink communication still has to perform real-time (e.g., per-slot) finer time and frequency synchronization and/or tracking based on sidelink signals sent by the transmitter UE (e.g., a relay UE or a head UE) engaged in sidelink communication with the receiver UE.

Accordingly, some aspects described herein relate to techniques to couple synchronization and communication in sidelink operation. In particular, a transmitter UE that is communicating on a sidelink with one or more receiver UEs may transmit a UE-specific sidelink synchronization signal that is only received and measured by the intended receiver UE(s). For example, as described herein, "UE-specific sidelink synchronization signal" may generally refer to a sidelink synchronization signal (e.g., an S-SSB, an S-PSS/S-SSS, and/or a sidelink-specific reference signal) that carries information unique or otherwise specific to the transmitter UE, a sidelink synchronization signal that is transmitted using time and/or frequency resources that are unique or otherwise specific to the transmitter UE, or a sidelink synchronization signal that carries information specific to the transmitter UE and is transmitted using time and/or frequency resources that are specific to the transmitter UE. In this way, sidelink communication between the transmitter UE and the receiver UE may be synchronized in a manner similar to access link communication, in that the receiver UE is synchronized to the transmitter UE in a similar manner as a served UE synchronized to a base station. In this way, coupled sidelink synchronization and communication may be more suitable for sidelink use cases such as UE sidelink relaying or UE-scheduled sidelink communication, because UEs may be able to run longer loops for time and frequency tracking in sidelink communication (e.g., a UE may not need to run a time and frequency tracking loop in every slot), which can significantly reduce UE implementation complexity and/or conserve resources, among other examples.

As indicated above, FIG. 6 is provided as an example. Other examples may differ from what is described with regard to FIG. 6.

Figure 7:
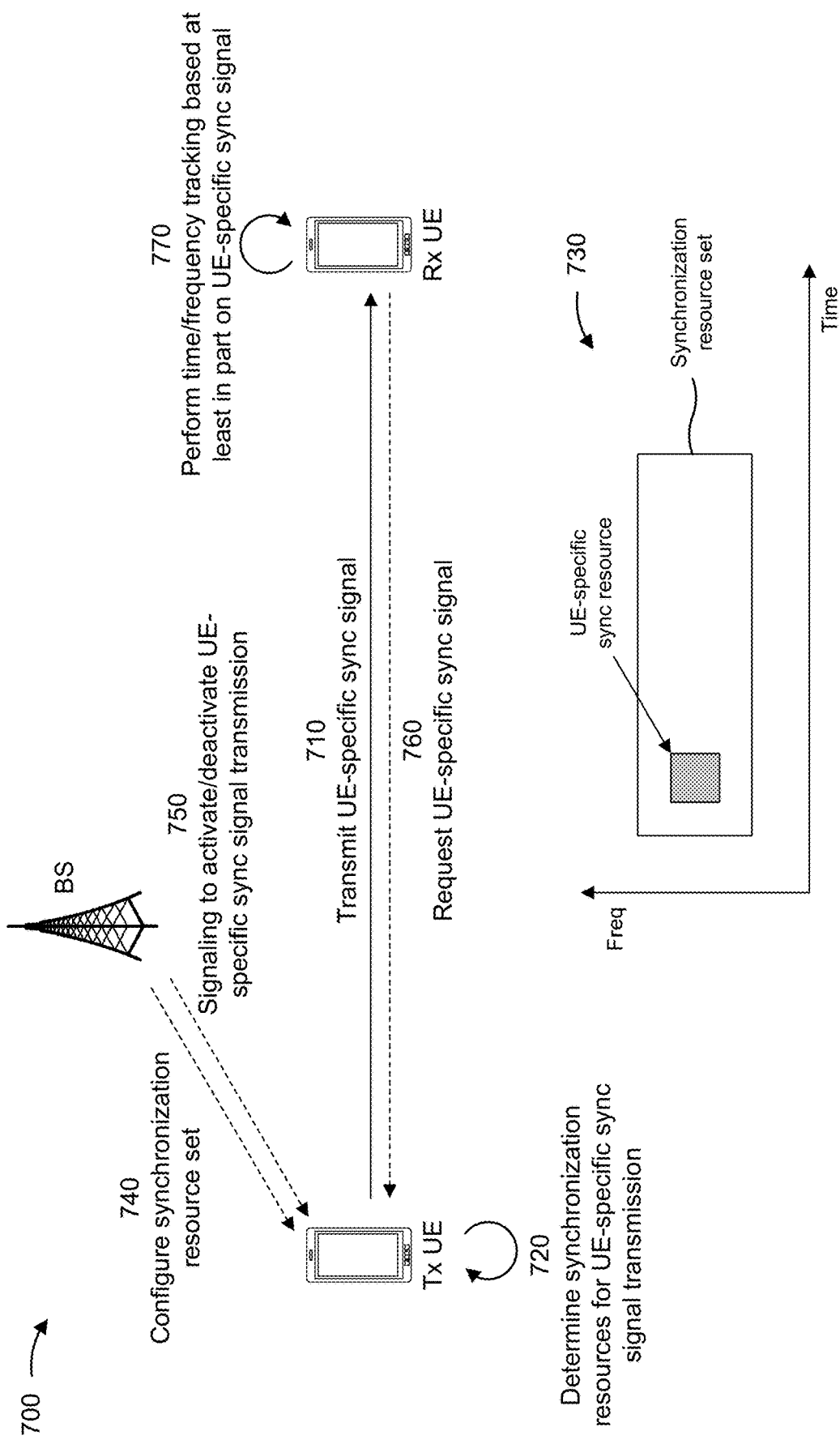
FIG. 7 is a diagram illustrating an example associated with synchronization in sidelink operation, in accordance with the present disclosure.

FIG. 7 is a diagram illustrating an example associated with synchronization in sidelink operation, in accordance with the present disclosure. As shown in FIG. 7, example 700 includes communication between a transmitter UE (shown as Tx UE) and a receiver UE (shown as Rx UE). In some aspects, the Tx UE and the Rx UE may communicate in a wireless network, such as wireless network 100, via a sidelink. Furthermore, in some aspects, the Tx UE may communicate with a base station via a wireless access link, which may include an uplink and a downlink (e.g., when acting in a sidelink relay role and/or communicating via the sidelink using Mode 1 scheduling in which the base station schedules or coordinates the sidelink communications). Additionally, or alternatively, the Tx UE and the Rx UE may communicate in a distributed manner without relying on scheduling or other coordination by a base station (e.g., when the Tx UE is acting in a sidelink scheduler or head UE role using Mode 2 scheduling).

In some aspects, as shown in FIG. 7, the Tx UE may transmit a UE-specific sidelink synchronization signal that includes information to align or otherwise synchronize time and/or frequency. For example, as described herein, the UE-specific sidelink synchronization signal may include an S-SSB, an S-PSS/S-SSS, a sidelink-specific reference signal, and/or another suitable signal that carries time and/or frequency information unique or otherwise specific to the Tx UE, a sidelink synchronization signal that is transmitted using synchronization resources that are unique or otherwise specific to the Tx UE (e.g., time and/or frequency resources in a synchronization resource set dedicated to the Tx UE and/or selected from a common synchronization resource set shared among multiple Tx UEs), or a sidelink synchronization signal that carries time and/or frequency information specific to the Tx UE and is transmitted using synchronization resources that are specific to the Tx UE. Because the sidelink synchronization signal is UE-specific (e.g., in contrast to a legacy S-SSB or SLSS, where multiple nodes may be transmitting the same synchronization signal using the same time and frequency resources in an SFN manner), only intended Rx UEs receive and measure the UE-specific sidelink synchronization signal.

In some aspects, the Tx UE may transmit the UE-specific sidelink synchronization signal in addition to a legacy S-SSB or a legacy SLSS or independently from any legacy S-SSB or SLSS. For example, in cases where the Tx UE may transmit the UE-specific sidelink synchronization signal in addition to a legacy S-SSB or a legacy SLSS, a first or primary set of synchronization resources may be configured for SFN-based transmission of the legacy S-SSB or SLSS, and a second or secondary set of synchronization resources may be configured and used for UE-specific sidelink synchronization signal transmissions by Tx UEs that are operating in certain sidelink roles (e.g., a Tx UE acting as a relay UE to relay uplink and downlink communications for a remote UE and/or a Tx UE acting as a head UE to schedule sidelink transmissions by one or more scheduled UEs). In such cases, one or more Tx UEs that have permission to transmit the UE-specific sidelink synchronization signal may use the secondary set of synchronization resources to transmit the UE-specific sidelink synchronization signal. Alternatively, in some aspects, transmission of the UE-specific sidelink synchronization signal in the secondary set of synchronization resources may be independent from (e.g., not reliant or otherwise dependent on) a synchronization signal carried in a legacy S-SSB or legacy SLSS. For example, in such cases, the Rx UE may obtain time and frequency information directly from the UE-specific synchronization signal transmitted in the secondary set of synchronization resources.

Accordingly, as shown by reference number 720, the Tx UE may be configured to determine the synchronization resources to use to transmit the UE-specific sidelink synchronization signal. For example, as shown by reference number 730, a synchronization resource set (e.g., a dedicated resource pool that includes a set of time and frequency resources) may be configured or preconfigured for UE-specific sidelink synchronization signal transmission, and the Tx UE may transmit the UE-specific sidelink synchronization signal using synchronization resources within the (pre)configured synchronization resource set. In some aspects, the synchronization resource set for UE-specific sidelink synchronization signal transmission may be periodic, where a period of the synchronization resource set may be equal to a period of a legacy sidelink synchronization resource (e.g., 160 ms), a fraction of the period of a legacy sidelink synchronization resource (e.g., 40 or 80 ms), or a multiple of the period of a legacy sidelink synchronization resource (e.g., 320 or 640 ms). Furthermore, as described above, the synchronization resource set used to transmit the UE-specific sidelink synchronization signal may be (pre)configured in addition to or independently from legacy sidelink synchronization resources. For example, in cases where the synchronization resource set used to transmit the UE-specific sidelink synchronization signal is (pre)configured in addition to legacy sidelink synchronization resources, the Rx UE may use a synchronization signal transmitted in the legacy sidelink synchronization resources for coarse time and/or frequency synchronization (e.g., the Rx UE may use the legacy synchronization signal to determine a frame and slot boundary), and the UE-specific sidelink synchronization signal may be used for finer time and/or frequency loop tracking (e.g., to estimate, relative to the frame and slot boundary, a timing offset or a frequency offset from the Tx UE).

In some aspects, as described herein, the synchronization resource set used to transmit the UE-specific sidelink synchronization signal may be configured (e.g., by the base station) or preconfigured (e.g., defined in a wireless communication standard or otherwise derived independent from a configuration provided by the base station). For example, in some aspects, different techniques may be used to configure or otherwise define the synchronization resource set used to transmit the UE-specific sidelink synchronization signal depending on whether the Tx UE and the Rx UE are engaged in sidelink communication based on Mode 1 scheduling (e.g., coordinated sidelink operation controlled by the base station) or sidelink communication based on Mode 2 scheduling (e.g., distributed sidelink operation independent of the base station).

For example, as shown by reference number 740, the synchronization resource set may be configured by the base station in cases where the Tx UE and the Rx UE are engaged in sidelink communication based on Mode 1 scheduling. In such cases, the base station may transmit, and the Tx UE may receive, semi-static or broadcast signaling to configure the synchronization resource set that includes the synchronization resources used to transmit the UE-specific sidelink synchronization signal. For example, in some aspects, the base station may configure the synchronization resource set in radio resource control (RRC) signaling, broadcast signaling, a system information block (SIB), and/or other suitable semi-static or broadcast signaling. In some aspects, the base station may then transmit, and the Tx UE may receive, dynamic signaling to allocate, within the configured synchronization resource set, the synchronization resources the Tx UE uses to transmit the UE-specific sidelink synchronization signal. For example, in some aspects, the dynamic signaling that allocates the synchronization resources to the Tx UE may include a legacy downlink control information (DCI) format associated with sidelink scheduling and/or a DCI format that is associated with allocating sidelink synchronization resources. Accordingly, in a Mode 1 scheduling configuration, the Tx UE may then transmit the UE-specific sidelink synchronization signal within the configured synchronization resource set, using a portion of the synchronization resource set allocated to the Tx UE. Additionally, or alternatively, in some cases, the synchronization resource set may be specific to the Tx UE (e.g., a synchronization resource set configured by the base station only includes UE-specific synchronization resources for a single Tx UE). In such cases, the Tx UE may always transmit the UE-specific sidelink synchronization signal in the synchronization resource set if the synchronization resource set is configured, or the base station may transmit and the Tx UE may receive control signaling (e.g., DCI) to activate and/or deactivate transmission of the UE-specific sidelink synchronization signal.

Additionally, or alternatively, for sidelink communication based on Mode 2 scheduling, the synchronization resource set that the Tx UE uses to transmit the UE-specific sidelink synchronization signal may be preconfigured (e.g., defined in a wireless communication standard) or configured by the base station (e.g., at a time when the Tx UE is in-coverage). In such cases, when the Tx UE transmits the UE-specific sidelink synchronization signal, the Tx UE may select the synchronization resources to use for the UE-specific sidelink synchronization signal transmission. For example, in some aspects, the Tx UE may randomly select the synchronization resources used for the UE-specific sidelink synchronization signal transmission from the (pre)configured synchronization resource set, or the synchronization resources used for the UE-specific sidelink synchronization signal transmission may be selected based on one or more UE identifiers (e.g., to increase a probability that different Tx UEs will transmit different UE-specific sidelink synchronization signals using different synchronization resources). For example, in cases where the Tx UE selects the synchronization resources used for the UE-specific sidelink synchronization signal transmission based on one or more UE identifiers, the Tx UE may employ a selection algorithm whereby locations of the synchronization resources used by the Tx UE is determined based at least in part on the one or more UE identifiers. For example, the selection algorithm may be based on a period of the synchronization resource set, P, where each period of the synchronization resource set includes a total number of synchronization resources, N, indexed from 0 to N−1. In this example, the synchronization resources that are selected for the UE-specific sidelink synchronization signal transmission may have an index of mod(UE_ID, N), where mod is a modulo operation and UE_ID is a UE identifier (e.g., a Layer-1 or a Layer-2 source identifier associated with the Tx UE and/or a Layer-1 or a Layer-2 destination identifier associated with the Rx UE).

In some aspects, as described herein, the UE-specific sidelink synchronization signal may correspond to a legacy sidelink synchronization signal (e.g., a legacy S-SSB or SLSS) that is transmitted using a UE-specific synchronization resource, a sidelink synchronization signal that carries information specific to the Tx UE and is transmitted using a legacy synchronization resource, or a sidelink synchronization signal that carries information specific to the Tx UE and is transmitted using a UE-specific synchronization resource. In cases where the UE-specific sidelink synchronization signal carries information specific to the Tx UE, the UE-specific sidelink synchronization signal may be an S-SSB in which a sequence identifier associated with the S-PSS and/or the S-SSS in the UE-specific S-SSB may be different from a sequence identifier associated with the S-PSS and/or the S-SSS in the legacy S-SSB (e.g., one or more sequence identifiers for the S-PSS and/or the S-SSS may be allocated for UE-specific sidelink synchronization signal transmissions). Additionally, or alternatively, the UE-specific S-SSB may include a PSBCH associated with different information than a legacy PSBCH. For example, the PSBCH in the UE-specific S-SSB and the PSBCH in the legacy S-SSB may have different contents, different scrambling sequence identifiers, and/or other different information. For example, in some aspects, an identifier related to UE-specific sidelink operation (e.g., a source identifier, a destination identifier, a group identifier, and/or another suitable identifier) may be carried in the payload of the PSBCH in the UE-specific S-SSB and/or used to generate a UE-specific scrambling sequence of the PSBCH in the UE-specific S-SSB. Alternatively, rather than using an S-SSB, the UE-specific sidelink synchronization signal may be configured as a sidelink reference signal. For example, the sidelink reference signal used as the UE-specific sidelink synchronization signal may be a sidelink tracking reference signal (S-TRS) or another suitable sidelink reference signal, which may be configured to be UE-specific by using a sidelink source identifier, a sidelink destination identifier, and/or other UE-specific parameter(s) as a seed to generate a sequence (e.g., a Gold sequence) for the sidelink reference signal.

In some aspects, the Tx UE may generally transmit the UE-specific sidelink synchronization signal when one or more conditions are satisfied. For example, as shown by reference number 750, the base station may transmit, and the Tx UE may receive, control signaling (e.g., DCI) to activate or otherwise enable transmission of the UE-specific sidelink synchronization signal. For example, in some aspects, the base station may enable transmission of the UE-specific sidelink synchronization signal by the Tx UE based on the Tx UE operating in a sidelink relay role and/or based on the Tx UE operating in a sidelink scheduler role. In another example, the base station may activate transmission of the UE-specific sidelink synchronization signal by the Tx UE based on the Tx UE transmitting a scheduling request (SR) message, a buffer status report (BSR) message, and/or another suitable message to the base station to indicate that the Tx UE has sidelink data to transmit. In this example, based on the one or more messages indicating that the Tx UE has sidelink data to transmit, the base station may activate transmission of the UE-specific sidelink synchronization signal to enable coupled sidelink synchronization and communication for the Tx UE and the Rx UE(s) intended to receive the sidelink data. In some aspects, in cases where the base station activates the UE-specific synchronization signal transmission, the base station may further transmit control signaling to subsequently deactivate the UE-specific sidelink synchronization signal transmission, at which time the Tx UE may cease to transmit the UE-specific sidelink synchronization signal.

Additionally, or alternatively, as shown by reference number 760, the Tx UE may transmit the UE-specific sidelink synchronization signal based on a request received from the Rx UE or another peer UE (e.g., another UE communicating with the Tx UE on a sidelink). For example, in some aspects, the Rx/peer UE may determine that the Rx/peer UE needs to perform a time and/or frequency tracking loop update (e.g., based on a decreased signal-tointerference-plus-noise ratio (SINR), a decreased CQI, and/or an increased block error rate (BLER), among other examples).

Accordingly, in such cases, the Rx/peer UE may transmit a request to the Tx UE to trigger transmission of the UE-specific sidelink synchronization signal by the Tx UE such that the time and/or frequency tracking loop update can be performed based on the UE-specific sidelink synchronization signal transmissions. Additionally, or alternatively, the Tx UE may autonomously determine whether and/or when to transmit the UE-specific sidelink synchronization signal (e.g., independently from the base station and/or any Rx UE(s) engaged in sidelink communication with the Tx UE). For example, in some aspects, the Tx UE may autonomously transmit the UE-specific sidelink synchronization signal when the Tx UE has sidelink data to transmit in order to couple sidelink synchronization with the subsequent sidelink communication.

In some aspects, as shown by reference number 770, the Rx UE that receives the UE-specific sidelink synchronization signal from the Tx UE may then perform a time and/or frequency tracking operation based at least in part on the UE-specific sidelink synchronization signal. For example, in some aspects, the Rx UE may receive a first signal from a third node (e.g., the base station, another base station, and/or another UE, among other examples), where the Rx UE uses the first signal for coarse time and/or frequency synchronization and uses the UE-specific sidelink synchronization signal received from the Tx UE for finer time and/or frequency tracking. For example, in some aspects, the Rx UE may receive a legacy S-SSB or a legacy SLSS in legacy S-SSB or SLSS resources, and the legacy S-SSB or SLSS may be used to determine at least a frame and slot boundary. Accordingly, when the Rx UE receives the UE-specific sidelink synchronization signal from the Tx UE in the synchronization resources used by the Tx UE, the UE-specific sidelink synchronization signal may be used for a finer loop update (e.g., to estimate a carrier frequency offset (CFO) and/or a slot timing offset (STO)). Additionally, or alternatively, the Rx UE may receive an access link synchronization signal (e.g., an SSB) from the base station or another base station, and may determine the frame and slot boundary based on the access link synchronization signal (e.g., in cases where a legacy S-SSB or legacy SLSS is not enabled or otherwise not transmitted). In either case, the finer time and/or frequency tracking that the Rx UE performs based on the UE-specific sidelink synchronization signal may be applied to sidelink control channel (e.g., PSCCH) and/or sidelink data channel (e.g., PSSCH) reception at a later time (e.g., to receive sidelink control channel and sidelink data channel transmissions from the Tx UE, thereby coupling sidelink synchronization and sidelink communication).

Alternatively, in some aspects, the Rx UE may perform a time and/or frequency tracking loop update based on only the UE-specific sidelink synchronization signal. For example, in some aspects, the Rx UE may only use time and/or frequency estimates that are obtained from the UE-specific sidelink synchronization signal when performing sidelink reception for sidelink signals transmitted by the Tx UE (e.g., the Rx UE may avoid performing time and/or frequency tracking loop updates based on other signals such as a DMRS carried in a sidelink data transmission). Alternatively, in another example, the Tx UE may indicate whether and/or when the Rx UE can apply time and/or frequency estimates obtained from the UE-specific sidelink synchronization signal to sidelink reception (e.g., when the UE-specific sidelink synchronization signal has a longer period than a legacy S-SSB, the UE-specific sidelink synchronization signal may be suboptimal for receiving a sidelink transmission after a threshold time, which the Tx UE may indicate based on an oscillator (e.g., a crystal oscillator) capability of the Tx UE). In another example, the Rx UE may determine the duration in which the time and/or frequency estimates from the UE-specific sidelink synchronization signal are valid (e.g., based on the oscillator capability of the Rx UE). Accordingly, as described herein, the Rx UE may generally apply time and/or frequency estimates from the UE-specific sidelink synchronization signal transmitted by the Tx UE in order to improve reception performance for sidelink control and/or data channel transmissions from the Tx UE, thereby coupling sidelink synchronization and communication. Furthermore, in cases where the Rx UE receives UE-specific sidelink synchronization signal transmissions from multiple Tx UEs, the Rx UE may run time and/or frequency tracking loops based on respective UE-specific sidelink synchronization signals transmitted by the multiple Tx UEs to couple sidelink synchronization and communication in a manner that may improve reception performance for sidelink control and/or data channel transmissions from each respective Tx UE.

As indicated above, FIG. 7 is provided as an example. Other examples may differ from what is described with regard to FIG. 7.

Figure 8:
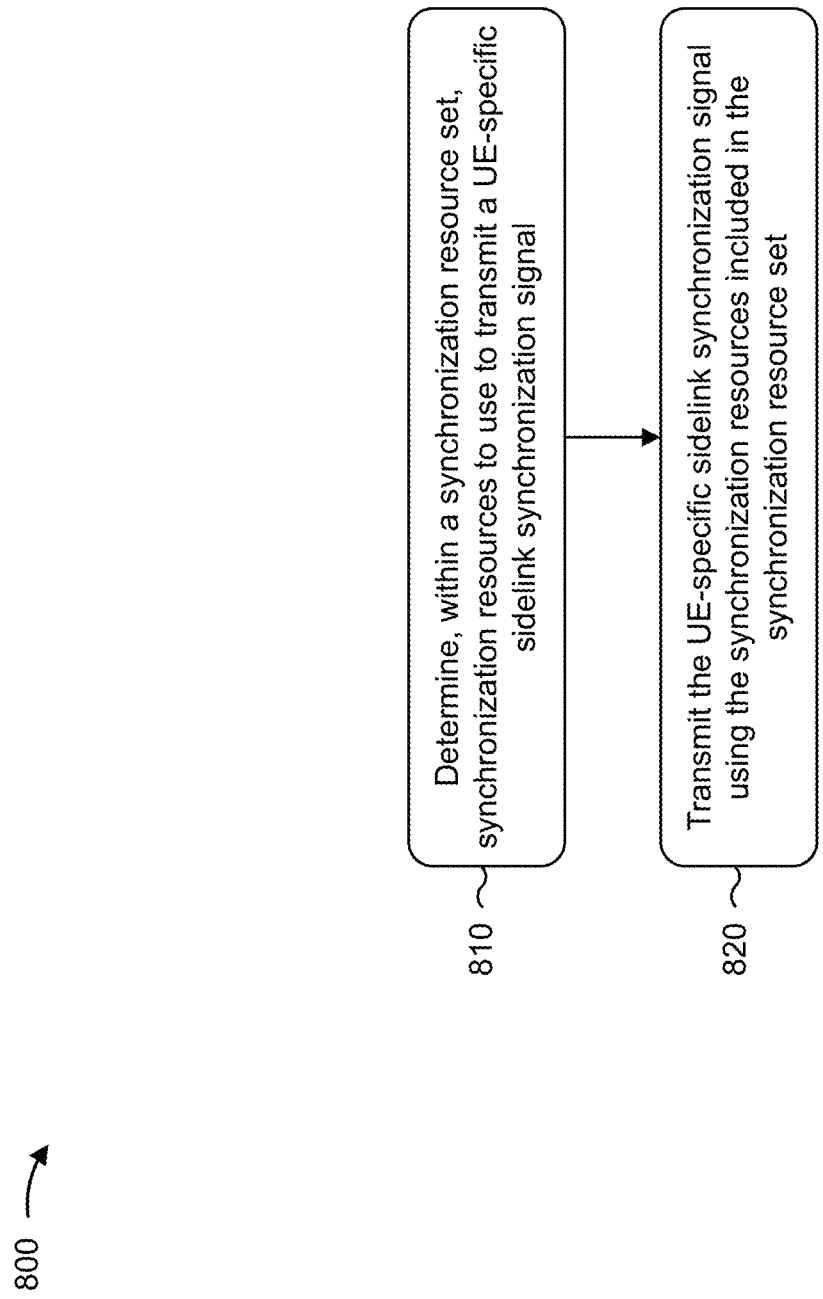
FIG. 8 is a diagram illustrating an example process associated with synchronization in sidelink operation, in accordance with the present disclosure.

FIG. 8 is a diagram illustrating an example process 800 performed, for example, by a UE, in accordance with the present disclosure. Example process 800 is an example where the UE (e.g., UE 120, UE 305, Tx/Rx UE 405, Rx/Tx UE 410, or the like) performs operations associated with synchronization in sidelink operation.

As shown in FIG. 8, in some aspects, process 800 may include determining, within a synchronization resource set, synchronization resources to use to transmit a UE-specific sidelink synchronization signal (block 810). For example, the UE (e.g., using communication manager 140 and/or resource determination component 908, depicted in FIG. 9) may determine, within a synchronization resource set, synchronization resources to use to transmit a UE-specific sidelink synchronization signal, as described above.

As further shown in FIG. 8, in some aspects, process 800 may include transmitting the UE-specific sidelink synchronization signal using the synchronization resources included in the synchronization resource set (block 820). For example, the UE (e.g., using communication manager 140 and/or transmission component 904, depicted in FIG. 9) may transmit the UE-specific sidelink synchronization signal using the synchronization resources included in the synchronization resource set, as described above.

Process 800 may include additional aspects, such as any single aspect or any combination of aspects described below and/or in connection with one or more other processes described elsewhere herein.

In a first aspect, the synchronization resources used to transmit the UE-specific sidelink synchronization signal are periodic and have a period that is based at least in part on a period of a legacy sidelink synchronization resource.

In a second aspect, alone or in combination with the first aspect, process 800 includes receiving, from a network node, semi-static or broadcast signaling to configure the synchronization resource set that includes the synchronization resources used to transmit the UE-specific sidelink synchronization signal.

In a third aspect, alone or in combination with one or more of the first and second aspects, process 800 includes receiving, from the network node, dynamic signaling to allocate, within the synchronization resource set, the synchronization resources used to transmit the UE-specific sidelink synchronization signal.

In a fourth aspect, alone or in combination with one or more of the first through third aspects, process 800 includes receiving, from a network node, control signaling to activate transmission of the UE-specific sidelink synchronization signal, wherein the UE-specific sidelink synchronization signal is transmitted using the synchronization resources included in the synchronization resource set based at least in part on the control signaling.

In a fifth aspect, in combination with the fourth aspect, the control signaling to activate transmission of the UE-specific sidelink synchronization signal is based at least in part on a sidelink role associated with the UE.

In a sixth aspect, in combination with one or more of the fourth or fifth aspects, process 800 includes transmitting, to the network node, one or more messages indicating that the UE has sidelink data to transmit, wherein the control signaling to activate transmission of the UE-specific sidelink synchronization signal is based at least in part on the one or more messages.

In a seventh aspect, alone or in combination with one or more of the first through sixth aspects, process 800 includes receiving, from a network node, control signaling to deactivate transmission of the UE-specific sidelink synchronization signal, and ceasing to transmit the UE-specific sidelink synchronization signal based at least in part on the control signaling.

In an eighth aspect, alone or in combination with one or more of the first through seventh aspects, determining the synchronization resources to use to transmit the UE-specific sidelink synchronization signal includes randomly selecting, within the synchronization resource set, the synchronization resources to use to transmit the UE-specific sidelink synchronization signal.

In a ninth aspect, alone or in combination with one or more of the first through eighth aspects, determining the synchronization resources to use to transmit the UE-specific sidelink synchronization signal includes autonomously selecting, within the synchronization resource set, the synchronization resources to use to transmit the UE-specific sidelink synchronization signal based at least in part on one or more UE identifiers.

In a tenth aspect, alone or in combination with one or more of the first through ninth aspects, the one or more UE identifiers include a source identifier associated with the UE or a destination identifier associated with a receiving UE intended to receive the UE-specific sidelink synchronization signal.

In an eleventh aspect, alone or in combination with one or more of the first through tenth aspects, the UE-specific sidelink synchronization signal is transmitted based at least in part on the UE determining that one or more conditions to transmit the UE-specific sidelink synchronization signal are satisfied.

In a twelfth aspect, alone or in combination with one or more of the first through eleventh aspects, process 800 includes receiving, from a peer UE, a request to transmit the UE-specific sidelink synchronization signal, wherein the UE-specific sidelink synchronization signal is transmitted based at least in part on the request from the peer UE.

In a thirteenth aspect, alone or in combination with one or more of the first through twelfth aspects, the UE-specific sidelink synchronization signal is an S-SSB.

In a fourteenth aspect, alone or in combination with one or more of the first through thirteenth aspects, the S-SSB includes a sequence identifier that is different from a sequence identifier used in a legacy S-SSB.

In a fifteenth aspect, alone or in combination with one or more of the first through fourteenth aspects, the S-SSB includes a PSBCH that is different from a legacy PSBCH.

In a sixteenth aspect, alone or in combination with one or more of the first through fifteenth aspects, the UE-specific sidelink synchronization signal is a sidelink reference signal.

In a seventeenth aspect, alone or in combination with one or more of the first through sixteenth aspects, a seed used to generate a sequence associated with the sidelink reference signal includes a sidelink source identifier associated with the UE or a sidelink destination identifier associated with a receiving UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel. For example, in some aspects, a UE that receives the UE-specific sidelink synchronization signal may communicate over a sidelink according to the UE-specific sidelink synchronization signal. In some cases, the transmitting UE and the UE that receives the UE-specific sidelink synchronization signal may communicate over the sidelink according to the UE-specific sidelink synchronization signal.

Figure 9:
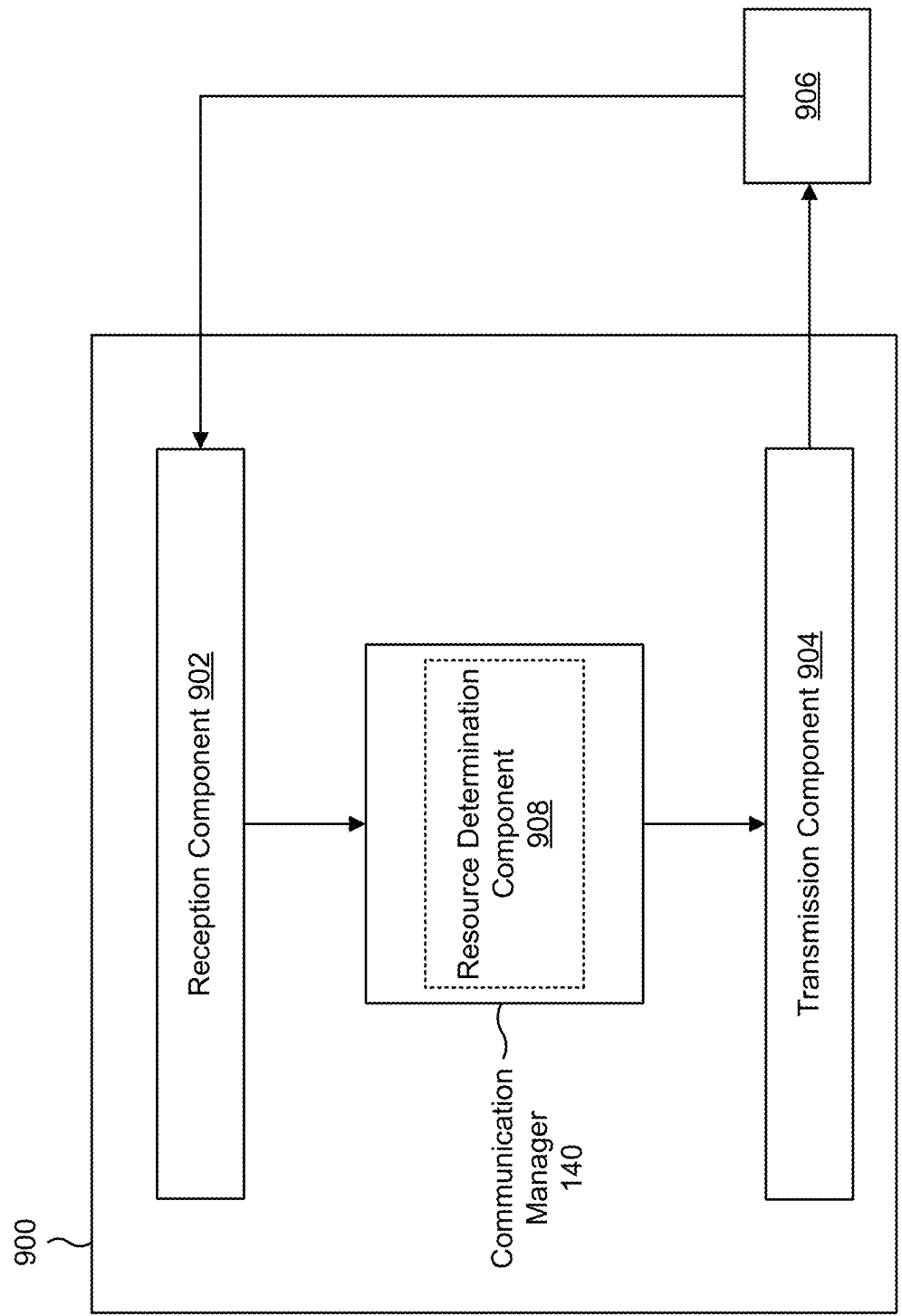
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a resource determination component 908, among other examples.

In some aspects, the apparatus 900 may be configured to perform one or more operations described herein in connection with FIG. 7. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The resource determination component 908 may determine, within a synchronization resource set, synchronization resources to use to transmit a UE-specific sidelink synchronization signal. The transmission component 904 may transmit the UE-specific sidelink synchronization signal using the synchronization resources included in the synchronization resource set.

The reception component 902 may receive, from a network node, semi-static or broadcast signaling to configure the synchronization resource set that includes the synchronization resources used to transmit the UE-specific sidelink synchronization signal.

The reception component 902 may receive, from the network node, dynamic signaling to allocate, within the synchronization resource set, the synchronization resources used to transmit the UE-specific sidelink synchronization signal.

The reception component 902 may receive, from a network node, control signaling to activate transmission of the UE-specific sidelink synchronization signal, wherein the UE-specific sidelink synchronization signal is transmitted using the synchronization resources included in the synchronization resource set based at least in part on the control signaling.

The transmission component 904 may transmit, to the network node, one or more messages indicating that the UE has sidelink data to transmit, wherein the control signaling to activate transmission of the UE-specific sidelink synchronization signal is based at least in part on the one or more messages.

The reception component 902 may receive, from a network node, control signaling to deactivate transmission of the UE-specific sidelink synchronization signal. The transmission component 904 may cease to transmit the UE-specific sidelink synchronization signal based at least in part on the control signaling.

The resource determination component 908 may randomly select, within the synchronization resource set, the synchronization resources to use to transmit the UE-specific sidelink synchronization signal.

The resource determination component 908 may autonomously select, within the synchronization resource set, the synchronization resources to use to transmit the UE-specific sidelink synchronization signal based at least in part on one or more UE identifiers.

The reception component 902 may receive, from a peer UE, a request to transmit the UE-specific sidelink synchronization signal, wherein the UE-specific sidelink synchronization signal is transmitted based at least in part on the request from the peer UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: determining, within a synchronization resource set, synchronization resources to use to transmit a UE-specific sidelink synchronization signal; and transmitting the UE-specific sidelink synchronization signal using the synchronization resources included in the synchronization resource set.

Aspect 2: The method of Aspect 1, wherein the synchronization resources used to transmit the UE-specific sidelink synchronization signal are periodic and have a period that is based at least in part on a period of a legacy sidelink synchronization resource.

Aspect 3: The method of any of Aspects 1-2, further comprising: receiving, from a network node, semi-static or broadcast signaling to configure the synchronization resource set that includes the synchronization resources used to transmit the UE-specific sidelink synchronization signal.

Aspect 4: The method of Aspect 3, further comprising: receiving, from the network node, dynamic signaling to allocate, within the synchronization resource set, the synchronization resources used to transmit the UE-specific sidelink synchronization signal.

Aspect 5: The method of any of Aspects 1-4, further comprising: receiving, from a network node, control signaling to activate transmission of the UE-specific sidelink synchronization signal, wherein the UE-specific sidelink synchronization signal is transmitted using the synchronization resources included in the synchronization resource set based at least in part on the control signaling.

Aspect 6: The method of Aspect 5, wherein the control signaling to activate transmission of the UE-specific sidelink synchronization signal is based at least in part on a sidelink role associated with the UE.

Aspect 7: The method of Aspect 5, further comprising: transmitting, to the network node, one or more messages indicating that the UE has sidelink data to transmit, wherein the control signaling to activate transmission of the UE-specific sidelink synchronization signal is based at least in part on the one or more messages.

Aspect 8: The method of any of Aspects 1-7, further comprising: receiving, from a network node, control signaling to deactivate transmission of the UE-specific sidelink synchronization signal; and ceasing to transmit the UE-specific sidelink synchronization signal based at least in part on the control signaling.

Aspect 9: The method of any of Aspects 1-2, wherein determining the synchronization resources to use to transmit the UE-specific sidelink synchronization signal includes: randomly selecting, within the synchronization resource set, the synchronization resources to use to transmit the UE-specific sidelink synchronization signal.

Aspect 10: The method of any of Aspects 1-2, wherein determining the synchronization resources to use to transmit the UE-specific sidelink synchronization signal includes: autonomously selecting, within the synchronization resource set, the synchronization resources to use to transmit the UE-specific sidelink synchronization signal based at least in part on one or more UE identifiers.

Aspect 11: The method of Aspect 10, wherein the one or more UE identifiers include a source identifier associated with the UE or a destination identifier associated with a receiving UE intended to receive the UE-specific sidelink synchronization signal.

Aspect 12: The method of any of Aspects 1-4 or 9-11, wherein the UE-specific sidelink synchronization signal is transmitted based at least in part on the UE determining that one or more conditions to transmit the UE-specific sidelink synchronization signal are satisfied.

Aspect 13: The method of any of Aspects 1-4 or 9-11, further comprising: receiving, from a peer UE, a request to transmit the UE-specific sidelink synchronization signal, wherein the UE-specific sidelink synchronization signal is transmitted based at least in part on the request from the peer UE.

Aspect 14: The method of any of Aspects 1-13, wherein the UE-specific sidelink synchronization signal is an S-SSB.

Aspect 15: The method of Aspect 14, wherein the S-SSB includes a sequence identifier that is different from a sequence identifier used in a legacy S-SSB.

Aspect 16: The method of any of Aspects 14-15, wherein the S-SSB includes a PSBCH that is different from a legacy PSBCH.

Aspect 17: The method of any of Aspects 1-13, wherein the UE-specific sidelink synchronization signal is a sidelink reference signal.

Aspect 18: The method of Aspect 17, wherein a seed used to generate a sequence associated with the sidelink reference signal includes a sidelink source identifier associated with the UE or a sidelink destination identifier associated with a receiving UE.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   determining, within a synchronization resource set, synchronization resources to use to transmit a UE-specific sidelink synchronization signal; and
   transmitting the UE-specific sidelink synchronization signal using the synchronization resources included in the synchronization resource set, wherein the UE-specific sidelink synchronization signal is activated for transmission based at least in part on the UE having sidelink data to transmit and control signaling.

2. The method of claim 1, wherein the synchronization resources used to transmit the UE-specific sidelink synchronization signal are periodic and have a period that is based at least in part on a period of a legacy sidelink synchronization resource.

3. The method of claim 1, further comprising:
   receiving, from a network node, semi-static or broadcast signaling to configure the synchronization resource set that includes the synchronization resources used to transmit the UE-specific sidelink synchronization signal.

4. The method of claim 3, further comprising:
   receiving, from the network node, dynamic signaling to allocate, within the synchronization resource set, the synchronization resources used to transmit the UE-specific sidelink synchronization signal.

5. The method of claim 1, further comprising:
   receiving, from a network node, control signaling to activate transmission of the UE-specific sidelink synchronization signal, wherein the UE-specific sidelink synchronization signal is transmitted using the synchronization resources included in the synchronization resource set based at least in part on the control signaling.

6. The method of claim 5, wherein the control signaling to activate transmission of the UE-specific sidelink synchronization signal is based at least in part on a sidelink role associated with the UE.

7. The method of claim 5, further comprising:
   transmitting, to the network node, one or more messages indicating that the UE has the sidelink data to transmit, wherein the control signaling to activate transmission of the UE-specific sidelink synchronization signal is based at least in part on the one or more messages.

8. The method of claim 1, further comprising:
   receiving, from a network node, control signaling to deactivate transmission of the UE-specific sidelink synchronization signal; and
   ceasing to transmit the UE-specific sidelink synchronization signal based at least in part on the control signaling to deactivate transmission of the UE-specific sidelink synchronization signal.

9. The method of claim 1, wherein determining the synchronization resources to use to transmit the UE-specific sidelink synchronization signal includes:
   randomly selecting, within the synchronization resource set, the synchronization resources to use to transmit the UE-specific sidelink synchronization signal.

10. The method of claim 1, wherein determining the synchronization resources to use to transmit the UE-specific sidelink synchronization signal includes:
    autonomously selecting, within the synchronization resource set, the synchronization resources to use to transmit the UE-specific sidelink synchronization signal based at least in part on one or more UE identifiers.

11. The method of claim 10, wherein the one or more UE identifiers include a source identifier associated with the UE or a destination identifier associated with a receiving UE intended to receive the UE-specific sidelink synchronization signal.

12. The method of claim 1, wherein the UE-specific sidelink synchronization signal is transmitted based at least in part on the UE determining that one or more conditions to transmit the UE-specific sidelink synchronization signal are satisfied.

13. The method of claim 1, further comprising:
    receiving, from a peer UE, a request to transmit the UE-specific sidelink synchronization signal, wherein the UE-specific sidelink synchronization signal is transmitted based at least in part on the request from the peer UE.

14. The method of claim 1, wherein the UE-specific sidelink synchronization signal is a sidelink synchronization signal block (S-SSB).

15. The method of claim 14, wherein the S-SSB includes a sequence identifier that is different from a sequence identifier used in a legacy S-SSB.

16. The method of claim 14, wherein the S-SSB includes a physical sidelink broadcast channel (PSBCH) that is different from a legacy PSBCH.

17. The method of claim 1, wherein the UE-specific sidelink synchronization signal is a sidelink reference signal.

18. The method of claim 17, wherein a seed used to generate a sequence associated with the sidelink reference signal includes a sidelink source identifier associated with the UE or a sidelink destination identifier associated with a receiving UE.

19. A user equipment (UE) for wireless communication, comprising:
    one or more memories; and
    one or more processors, coupled to the one or more memories, configured to:
       determine, within a synchronization resource set, synchronization resources to use to transmit a UE-specific sidelink synchronization signal; and
       transmit the UE-specific sidelink synchronization signal using the synchronization resources included in the synchronization resource set, wherein the UE-specific sidelink synchronization signal is activated for transmission based at least in part on the UE having sidelink data to transmit and control signaling.

20. The UE of claim 19, wherein the synchronization resources used to transmit the UE-specific sidelink synchronization signal are periodic and have a period that is based at least in part on a period of a legacy sidelink synchronization resource.

21. The UE of claim 19, wherein the one or more processors are further configured to:
    receive, from a network node, semi-static or broadcast signaling to configure the synchronization resource set that includes the synchronization resources used to transmit the UE-specific sidelink synchronization signal; and receive, from the network node, dynamic signaling to allocate, within the synchronization resource set, the synchronization resources used to transmit the UE-specific sidelink synchronization signal.

22. The UE of claim 19, wherein the one or more processors are further configured to:

receive, from a network node, the control signaling to activate transmission of the UE-specific sidelink synchronization signal, wherein the UE-specific sidelink synchronization signal is transmitted using the synchronization resources included in the synchronization resource set based at least in part on the control signaling.

23. The UE of claim 19, wherein the one or more processors are further configured to:

receive, from a network node, the control signaling to deactivate transmission of the UE-specific sidelink synchronization signal; and cease to transmit the UE-specific sidelink synchronization signal based at least in part on the control signaling.

24. The UE of claim 19, wherein the one or more processors, to determine the synchronization resources to use to transmit the UE-specific sidelink synchronization signal, are configured to:

randomly select, within the synchronization resource set, the synchronization resources to use to transmit the UE-specific sidelink synchronization signal.

25. The UE of claim 19, wherein the one or more processors, to determine the synchronization resources to use to transmit the UE-specific sidelink synchronization signal, are configured to:

autonomously select, within the synchronization resource set, the synchronization resources to use to transmit the UE-specific sidelink synchronization signal based at least in part on one or more UE identifiers, wherein the one or more UE identifiers include a source identifier associated with the UE or a destination identifier associated with a receiving UE intended to receive the UE-specific sidelink synchronization signal.

26. The UE of claim 19, wherein the UE-specific sidelink synchronization signal is transmitted based at least in part on the UE determining that one or more conditions to transmit the UE-specific sidelink synchronization signal are satisfied.

27. The UE of claim 19, wherein the one or more processors are further configured to:

receive, from a peer UE, a request to transmit the UE-specific sidelink synchronization signal, wherein the UE-specific sidelink synchronization signal is transmitted based at least in part on the request from the peer UE.

28. The UE of claim 19, wherein the UE-specific sidelink synchronization signal is a sidelink synchronization signal block (S-SSB) or a sidelink reference signal.

29. A non-transitory computer-readable medium storing a set of instructions for wireless communication, the set of instructions comprising:

one or more instructions that, when executed by one or more processors of a user equipment (UE), cause the UE to:

determine, within a synchronization resource set, synchronization resources to use to transmit a UE-specific sidelink synchronization signal; and transmit the UE-specific sidelink synchronization signal using the synchronization resources included in the synchronization resource set, wherein the UE-specific sidelink synchronization signal is activated for transmission based at least in part on the UE having sidelink data to transmit and control signaling.

30. An apparatus for wireless communication, comprising:

means for determining, within a synchronization resource set, synchronization resources to use to transmit an apparatus-specific sidelink synchronization signal; and means for transmitting the apparatus-specific sidelink synchronization signal using the synchronization resources included in the synchronization resource set, wherein the apparatus-specific sidelink synchronization signal is activated for transmission based at least in part on the apparatus having sidelink data to transmit and control signaling.

* * * * *